June 25, 1968  J. A. BLUISH  3,390,389
SELF-TEST MEANS FOR A SERVO SYSTEM
Filed Dec. 6, 1965  4 Sheets-Sheet 1

INVENTOR.
JOSEPH A. BLUISH
BY
ATTORNEY

INVENTOR.
JOSEPH A. BLUISH
BY
Herbert L. Davis
ATTORNEY

United States Patent Office

3,390,389
Patented June 25, 1968

3,390,389
SELF-TEST MEANS FOR A SERVO SYSTEM
Joseph A. Bluish, Rochelle Park, N.J., assignor to The Bendix Corporation, a corporation of Delaware
Filed Dec. 6, 1965, Ser. No. 511,759
20 Claims. (Cl. 340—314)

This invention relates to a self-test means for a servo system and more particularly to a novel means for effecting a test of an automatic flight control system dependent upon an introduction of a step command signal into the control system with a controlling transfer function and the measurement of the signal at a point at which system performance may be evaluated.

An object of the invention is to provide a means for effecting signal measurement by means of an integrator which, in determining acceptable performance, evaluates the time history of the signal so that both static gain and dynamic performance of the system may be evaluated.

Heretofore, a need for this feature of the present invention has arisen in the provision of a self-test means for a non-multiple series yaw damper for a hydraulic motor operated rudder of an aircraft and particularly in the implementation of novel means for effecting preflight evaluation to determine the operational acceptability of the damper system in which the self-test feature is a part of the equipment of the automatic pilot control system; i.e., the automatic pilot control system has the test facilities included therein so as to eliminate need for external support equipment and which test facilities are so arranged as to only be initiated with the aircraft under test being on the ground with the damper system being (1) operatively disengaged during an initial test phase and (2) operatively engaged during a succeeding and final test phase.

An object of the invention therefore in effecting the foregoing, is to provide a damper system incorporating a yaw rate signal generating means which may apply an alternating current signal through a bandpass filter having pre-determined break frequencies dependent upon the operational characteristics of the aircraft and in which the filter transfer function is so provided as to have a specific time response to a step command signal which serves as a controlling factor of the self-test means.

Another object of the invention is to provide in such a damper system novel signal integrating means, whereby system performance may be evaluated by integrating resulting test signals effected over separate test periods or first and second test phases and in which in proper operation of the system these resultant test signals all start from null and return to null during the test period in such a manner that test timing is not critical, and the resultant test signal configuration may serve to control suitable indicator means for effecting an evaluation of the signal nulls and thereby the operating condition of the system under test.

Another object of the invention is to provide in such a damper system novel means whereby the signals to be tested have specific time histories primarily controlled by the system band-pass filter so that the resultant test signal magnitude and the critical dynamic response characteristics of the entire system may be evaluated in a practical manner without tight tolerance control of a test network.

Another object of the invention is to provide in such a damper system a novel self-test feature which may be initiated with the aircraft on the ground and with the damper system disengaged and in which a test switch may be actuated so that if the test operation be successful, a "go" indication will appear at test completion.

Another object of the invention is to provide in the series yaw damper for an automatic flight control system novel means for testing the control mechanism for the system while the damper is disengaged and the aircraft is on the ground by momentary actuation of a test button, so as to render effective a relay mechanism for initiating operation of a time delay relay controlling operation of a conventional gyro test coil so as to produce an alternating current output signal which will be processed through a band-pass filter resulting in a characteristic wave signal which will be reproduced through the operation of a synchronizer and applied through an integrator and relay amplifier so as to control energization of a relay winding to effect operation of suitable indicator lamps to indicate an acceptable or unacceptable system performance during a first test phase to provide an evaluation of the operation of the control mechanism.

Another object of the invention is to provide, in combination with the aforenoted test system, novel means for initiating a succeeding or second test phase, which is primarily an evaluation of the boost package for controlling the aircraft rudder and which is initiated by engaging the yaw damper and effecting operation of suitable relay mechanism for controlling the second test phase through the integrator so that it will provide an evaluation of the operation of the boost package.

Another object of the invention is to provide in the aforenoted mechanism a novel test network to produce an integrator output equal to a pre-determined bias to effect the controlled operation of suitable indicator lamps upon acceptable or unacceptable tests of the system during the first and second test phases thereof.

These and other objects and features of the invention are pointed out in the following description in terms of the embodiments thereof which are shown in the accompanying drawings. It is to be understood, however, that the drawings are for the purpose of illustration only and are not a definition of the limits of the invention. Reference is to be had to the appended claims for this purpose.

In the drawings in which corresponding numerals indicate corresponding parts:

Figure 1:
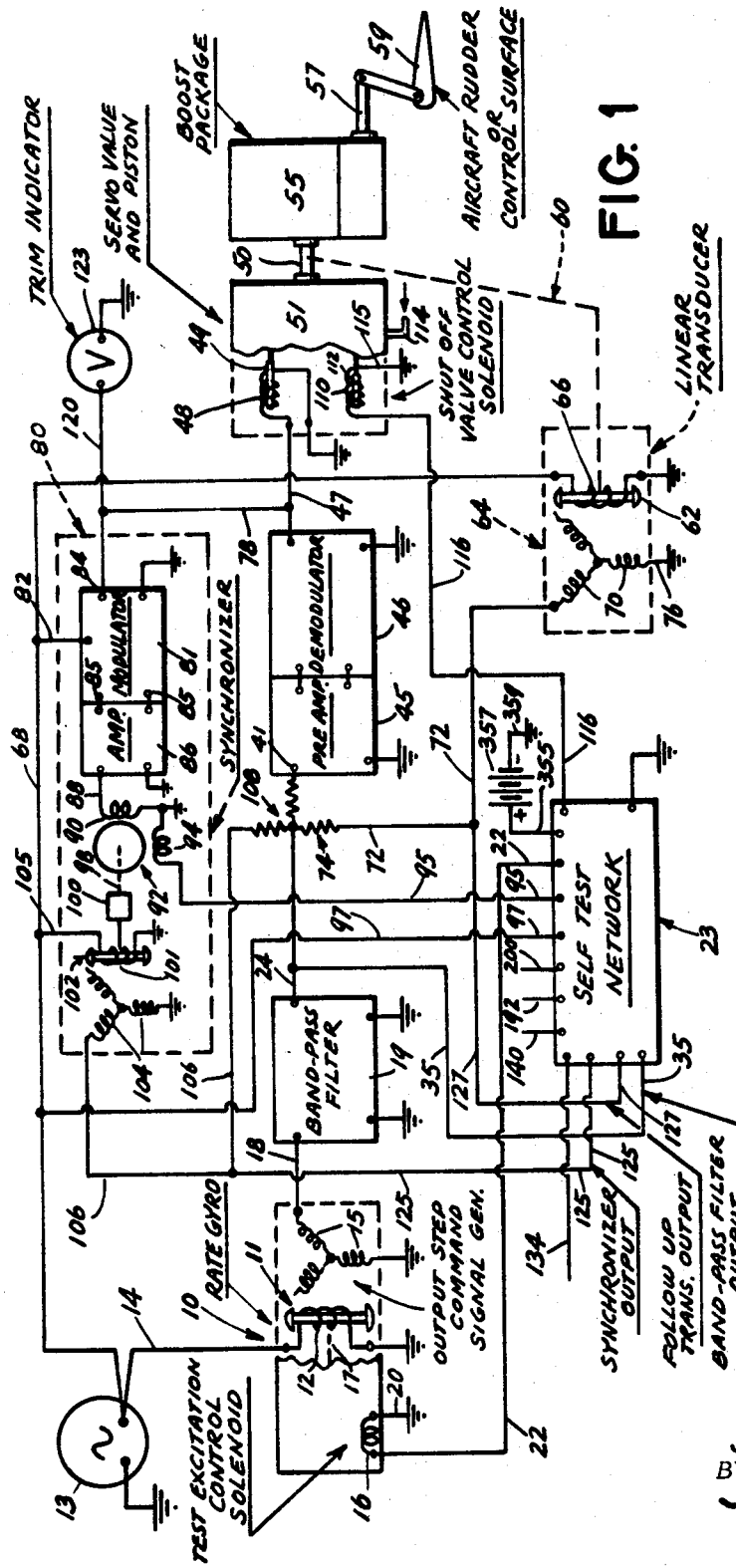
FIGURE 1 is a schematic block diagram of a typical series yaw damper of an automatic flight control system in which there have been shown the several points of the system at which the controlling signals are sensed for operating the self-test mechanism in the first and second test phases.

Referring now to the drawing of FIGURE 1, there is indicated by numeral 10 a single axis rate gyroscope which may be of a type such as disclosed and claimed in a copending U.S. application Ser. No. 327,268, filed Dec. 2, 1963, by Alex Morsewich, now U.S. Patent No. 3,240,050, granted Mar. 15, 1966, and assigned to the Bendix Corporation.

The single axis rate gyroscope 10 may be a small rate sensing gyroscope measuring angular velocity of the aircraft about the yaw axis in which a suitable motor for driving the gyro rotor, not shown, and a signal pick-off synchro or output step command signal generator 11 includes a rotor winding 12 energized from a suitable source of alternating current 13 through a conductor 14. The rotor winding 12 of the synchro 11 is inductively coupled to stator windings 15.

As described in the U.S. Patent No. 3,240,050, energization of a control solenoid or torquing coil, indicated diagrammatically in FIGURE 1 by the numeral 16 effects a deflection of the rate gyroscope 10 about the single axis thereof imparting a corresponding deflection through a shaft 17 to the rotor winding 12 of the signal pick-off synchro 11. Such deflection of the rotor winding 12 relative to the stator windings 15 cause an alternating current step command signal to be induced in the stator windings 15 of the synchro 11 and applied through conductor 18 to the input of a band-pass filter 19.

Figure 4:
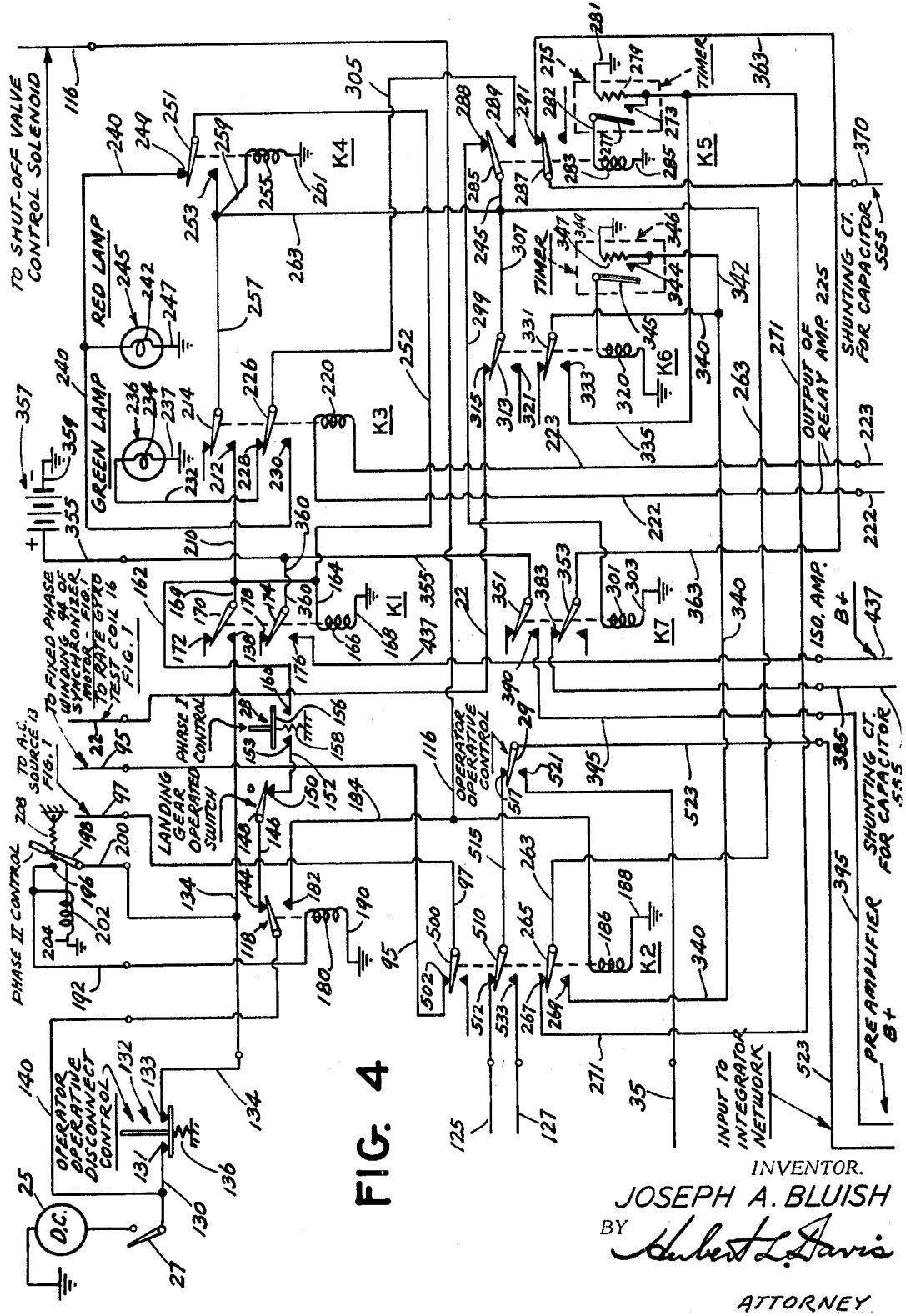
FIGURE 4 is a schematic wiring diagram of the control relay mechanism portion of the self-test network of FIGURE 1.
Figure 5:
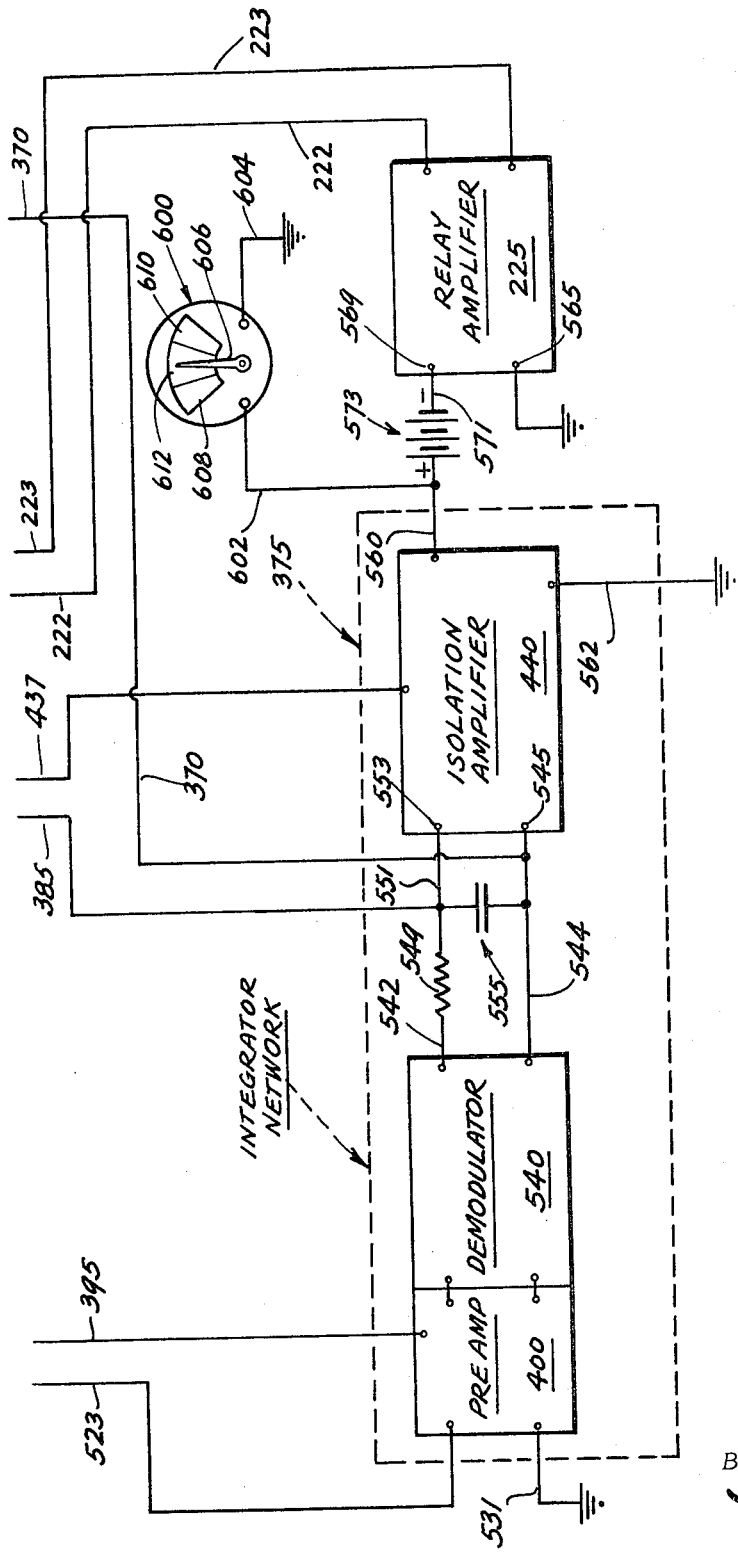
FIGURE 5 is a schematic wiring diagram of the integrator portion of the self-test network of FIGURE 1.

As shown in FIGURE 1, the gyro test or torquing coil 16 is connected through a grounded conductor 20 and a conductor 22 into a self-test network 23 which is shown in greater detail in FIGURES 4 and 5.

Upon the test coil 16 being energized by the operation of the self-test network 23, as hereinafter explained, a torque is applied to the rate gyro 10, as shown and described in the U.S. Patent No. 3,240,050. This torque applied to the rate gyro 10 effects a test of the output of the gyroscope, as hereinafter explained by an alternating current step command signal being applied from the pick-off synchro 11 through the conductor 18 to the input of the band-pass filter 19 which may be of a conventional type so arranged as to apply to an output conductor 24 a signal of a relative amplitude waveform shown graphically by FIGURE 3.

Thus, applying a direct current from a suitable source 25 through closure of a control switch 27 and momentary closure of a switch 28, there may be effected through the control relay mechanism of the self-test network 23 the energization of the torquing winding 16 of the rate gyroscope 10. The step input command signal then applied by synchro 11 through the conductor 18 to band-pass filter 19 and therethrough to the output conductor 24 is then applied through the conductor 35 to the self-test network 23, the wiring diagram of which is shown in detail in FIGURE 4. This output of the band-pass filter may be selectively sensed in the self-test network as upon appropriate operation of a suitable operator-operative control switch 29, as hereinafter explained, so as to assure proper operation of the gyroscope 10 and the signal pick-off synchro 11 thereof.

Furthermore, the yaw rate signals from the pick-off synchro 11 of the rate gyroscope 10 are applied through the band-pass filter 19 and output conductor 24 to the input 41 of a pre-amplifier 45 of conventional type and therethrough to a demodulator 46 also of conventional type having output conductor 47 leading to a control winding 48 of a solenoid to operate a servo valve (not shown) positioned by an armature 49 to control a hydraulically operated piston (not shown), which in turn positions a piston rod 50 shown in FIGURE 1 of a servo valve and piston device 51.

The arrangement of the device 51 is such that the displacement of the armature 49 and resulting control of the servo valve and hydraulically operated piston rod 50 is proportional to the amplitude of the direct current signal applied to the control winding 48. The control winding 48 is arranged to actuate armature 49 which may be biased by opposing spring means to a neutral position and operatively connected through a stem to the servo valve for controlling the hydraulically operated piston 50 in a conventional manner. The direct current signal is supplied from the output of the demodulator 46 through the conductor 47 to the control winding 48. In response to the amplitude of the direct current signal applied across the control winding 48, the armature 49 operates a servo valve and piston controlled thereby so as to position through the piston rod 50, a control valve of a boost package 55 of conventional type to in turn control a piston for adjustable positioning through a piston rod 57 a rudder 59 of the aircraft.

Connected to the piston rod 50 through a follow-up linkage 60 is a rotor element 62 of a synchro or linear transducer 64. The rotor element 62 has a winding 66 operably connected through a conductor 68 to the source of alternating current 13. The rotor winding 66 is arranged to induce in stator windings 70 of the synchro 64 a negative feedback signal applied in conventional manner through a conductor 72 to an adder circuit 74 and algebraically summed in opposing relation therein with the controlling signal applied from the filter 19 to the input 41 of the preamplifier 45. An opposite end of the stator winding 70 is connected to ground through an electrical conductor 76.

Further electrically connected to the conductor 47 leading from the demodulator 46 to the input of the solenoid winding 48 is a conductor 78 leading to an input of a synchronizer 80 which may be of a conventional type. The synchronizer 80 is shown as including a modulator 81 energized by the source of alternating current 13 through a conductor 82. The modulator 81 has an input 84 connected to the conductor 78 and an output 85 connected to an input of an amplifier 86. An output conductor 88 leads from the amplifier 86 to a control winding 90 of a two-phase motor 92 of conventional type having a fixed phase winding 94 serially connected through conductors 95 and 97 to the source of alternating current 13 through the control relay mechanism of the self-test network 23.

The motor 92 drives through a shaft 98 and suitable reduction gearing 100 a rotor winding 101 of a synchro 102 having stator windings 104. The rotor winding 101 is connected to the source of alternating current 13 through a conductor 105 and is adjustably positioned by the motor 92 so as to induce in stator windings 104 a negative feedback signal which is applied in conventional manner through a conductor 106 to an adder network 108 and algebraically summed in opposing relation therein with the controlling signal applied from the filter 19 to the input 41 of the preamplifier 45.

Controlling the supply of hydraulic pressure for operation of the servo valve and piston 51 is a cut-off valve (not shown) of conventional type which may be operated by a shut-off valve control solenoid winding 110 which when energized is effective to actuate an armature 112 so as to position the shut-off valve so as to connect the supply of hydraulic fluid under pressure applied through a conduit 114 to the servo valve and piston device 51 to effect the operation of the servo piston and position the piston rod 50. Upon the solenoid winding 110 controlling the cut-off valve being de-energized, the armature 112 may be biased by suitable spring means to a position to close the connection of the fluid pressure conduit 114 and shut off the supply of hydraulic fluid to the servo valve and piston 51. The solenoid winding 110 has one end connected to ground through a conductor 115. Energization of the solenoid winding 110 operating the shut-off valve is effected through an electrical conductor 116 leading from the opposite end of the control winding 110 to the control relay mechanism of the self-test network 23, in which energization of the shut-off valve control solenoid 110 is effectively controlled by a relay switch arm 118 shown by FIGURE 4, as hereinafter explained.

Further, leading from the input control conductor 78 of the synchronizer 80 is a conductor 120 which leads to a suitable indicator device such as voltmeter or ammeter 123. The indicator device 123 in response to the output signal applied through the conductor 78 provides a trim indication.

Further controlling the operation of the self-test network 23, as hereinafter explained, is the conductor 35 leading from the output conductor 24 of the band-pass filter 19, a conductor 125 leading from the output conductor 106 of the synchronizer 92 and a conductor 127 leading from the output conductor 72 of the follow-up linear transducer or synchro 64.

Self-test network

The series yaw damper system shown in FIGURE 1 may be of a conventional type and has been illustrated herein somewhat in detail so as to better show the operative environment in which the present invention is adapted for use. The present invention is directed to the self-test network illustrated by block diagram in FIGURE 1 and in diagrammatic detail in FIGURES 4 and 5.

In the wiring diagram shown in FIGURE 4, the source of direct current 25 is connected through an operator-operative control switch 27 which may be selectively closed so as to effect an energizing circuit from the source 25 through a conductor 130 and a wheel disconnected switch 132 normally closing a switch contact 131 and a contact 133 connected to a conductor 134.

The switch 132 is normally biased to a closed position by a spring 136 and thereby connect the source 25 to the conductor 134 leading to a normally open relay switch contact 138 which may be selectively closed to complete the energizing circuit, as hereinafter explained.

The conductor 130 is also connected through a conductor 140 to the relay switch arm 118 normally biased under spring tension so as to close a relay contact 144 connected through a conductor 146 to a switch arm 148. The switch arm 148 is so operatively connected to the landing gear of the aircraft that upon the aircraft being on the ground, the switch 148 is so operated as to close a contact 150. However, upon the aircraft being off the ground, the switch arm 148 is operated by retraction of the landing gear so as to open the contact 150. The contact 150 is electrically connected to a conductor 152 leading to a contact 153 of the test button or switch 28 having a switch element 156 biased by a spring 158 so as to normally open the contact 153 in relation to a second contact 160 of the switch 28.

The switch element 156 of the test button 28 may be positioned by the operator against the force of the spring 158 so as to momentarily close the contacts 153 and 160. The contact 160 is connected through a conductor 162 to a conductor 164 leading to one end of a winding 166 of a relay K1. The opposite end of the relay winding 166 is grounded at 168.

The conductor 162 is also connected to a conductor 169 leading to switch arm 170 controlled by the winding 166 and effective upon energization thereof to close a relay contact 138 so as to effect a holding circuit for energizing the relay winding 166. The relay switch arm 170 is normally biased under spring tension into engaging relation with an open contact 172 and out of closing relation with the switch contact 138.

The relay winding 166 is also effective upon energization to actuate a relay switch arm 174 into closing relation with a relay switch contact 176 for a purpose which will be explained hereinafter. The switch arm 174 is normally biased under spring tension into contacting relation with an open switch contact 178 and out of closing relation with the contact 176.

The relay switch arm 118 is normally biased under spring tension into closing relation with the relay contact 144. Upon energization of a relay winding 180, the relay switch arm 118 is biased into closing relation with a switch contact 182, which in turn is connected through a conductor 184 to one end of a winding 186 of a relay K2. The opposite end of the relay winding 186 is connected to ground through a conductor 188. The relay winding 180 may be the actuating relay for system engagement of a conventional automatic pilot.

There also leads from the conductor 184 the conductor 116 which leads to the shut-off valve control solenoid winding 110 having an opposite end connected to ground at 115. The solenoid winding 110 upon energization actuates the armature 112 so as to operate a hydraulic pressure shut off control valve from an "off" to an "on" condition to render the servo valve and piston mechanism 51 effective for operation. However, upon de-energization of the solenoid winding 110, the hydraulic pressure control valve operated by the armature 112 is returned from the "on" to the "off" condition so as to render the device 51 inoperative, as will be explained hereinafter.

The relay winding 189 which controls the position of the relay switch arm 118 is connected at one end to ground through a conductor 190 and at the opposite end is connected through a conductor 192 to a switch contact 196 which may be closed by a manually operable switch arm 198 connected through a conductor 200 to the conductor 134. Also, connected to the conductor 192 is a relay winding 202 having an opposite end connected to ground through a conductor 204. The relay winding 202 is effective then upon the closure by switch arm 198 of the switch contact 196 to hold the switch arm 198 in the position closing the switch contact 196. Also the closure of the switch contact 196 by switch arm 198 is effective to cause energization of the relay winding 180 to actuate the relay switch arm 118 into an open relation with the contact 144 and is a closed relation with the switch contact 182.

The manually operable switch arm 198 is normally biased under tension of a spring 208 so that upon the energizing circuit from the direct current source 25 being opened by the operator actuating the wheel disconnect switch 132 out of a closing relation with the switch contacts 131 and 133, the relay winding 202 will be de-energized and the switch arm 198 will be actuated out of closing relation with the switch contact 196 under the biasing force of the spring 208.

A conductor 210 leads from the conductor 162 to a relay switch contact 212 controlled by a relay switch arm 214 normally biased out of contacting relation therewith under suitable spring tension and biased into contacting relation with the switch contact 212 upon energization of a winding 220 of a relay K3. The relay winding 220 is in turn connected through conductors 222 and 223 to the output of a relay amplifier 225, as shown in FIGURE 5, which is operative as hereinafter explained.

The relay winding 220 also controls the operation of a relay switch arm 226 which is normally biased under spring tension into contacting relation with the relay contact 228 and which upon energization of the relay winding 220 is biased out of contacting relation with the relay contact 223 and into contacting relation with a relay contact 230.

The relay contact 228 is connected by a conductor 232 to one end of a filament 234 of a green indicator lamp 236. The opposite end of the filament 234 is connected to ground through a conductor 237.

The relay contact 230 is connected by a conductor 240 to one end of a filament 242 of a second or red indicator lamp 245. The opposite end of the filament 242 is connected to ground through a conductor 247. The conductor 240 further leads to a relay contact 249 controlled by a relay switch arm 251 electrically connected by a conductor 252 to the conductor 162 and normally biased under spring tension into contacting relation with the contact 249. The relay switch arm 251 may be biased out of contacting relation with the relay contact 249 and into closing relation with the relay contact 253 upon energization of a winding 255 of a relay K4. The relay contact 253 is connected by an electrical conductor 257 to the relay switch arm 214 and the conductor 257 is further connected by a conductor 259 to one end of the relay winding 255, the opposite end of which is connected by a conductor 261 to a common ground.

Also connected to the conductor 257 is an electrical conductor 263 which leads to a relay switch arm 265 which is normally biased under spring tension into contacting relation with a relay contact 267. The relay switch arm 265 may be biased out of contacting relation with the relay switch contact 267 and into contacting relation with a second relay switch contact 269 upon energization of the relay winding 186 connected through the electrical conductor 184 to the switch contact 182 controlled by the switch arm 118 operated by the relay winding 180.

The relay switch contact 267 is connected by a conductor 271 to a switch contact 273 of a thermal timer 275. The thermal timer 275 may be of conventional type and the contact 273 may be controlled by a bi-metallic switch element 277 which is in turn controlled by a heater element 279 connected at one end to the conductor 271 and at the opposite end to ground by a conductor 281. The bi-metallic switch element 277 is connected by a conductor 282 to one end of a relay winding 283. The opposite end of the winding 283 is connected to ground through a conductor 285.

Thus upon the switch arm 265 closing the relay switch contact 267 and electrical energy being applied therethrough to the heater element 279, the bi-metallic switch element 277 will close the contact 273 after a predetermined time delay period whereupon the winding 283 of a relay K5 will be effectively energized therethrough in conventional manner.

Upon energization of the relay winding 283, relay switch arms 285 and 287 controlled thereby will be effectively actuated so as to cause the relay switch arm 285 to open a contact 288 and close a contact 289 and cause a relay switch arm 287 to open a relay switch contact 291. The relay switch arms 285 and 287 are normally biased under spring tension so as to close the relay switch contacts 288 and 291, respectively, upon de-energization of the relay winding 283 of the relay K5.

The electrical conductor 263 leading from the conductor 257 as heretofore explained, is connected through a conductor 295 to the relay arm 285 which may selectively close the relay switch contact 288 and 289 dependent upon whether the relay winding 283 is energized or not. The relay switch contact 288 is connected through an electrical conductor 299 to one end of a winding 301 of a relay K7. The opposite end of the relay winding 301 is connected through a conductor 303 to a common ground. On the other hand, the relay switch contact 289 is connected through an electrical conductor 305 to the relay switch arm 226 which is controlled by the relay winding 220.

Further connected to the conductor 263 is a conductor 307 leading to the relay switch arm 313 which is normally biased under spring tension into a contacting relation with a relay switch contact 315 connected through the electrical conductor 22 to the torquing coil 16 of the rate gyroscope 10, as heretofore explained.

The relay switch arm 313 is controlled by a winding 320 of relay K6 and is so arranged that upon energization of the relay winding 320 the switch arm 313 is biased out of contacting relation with the relay contact 315 and into contacting relation with an open contact 321 so as to effect de-energization of the torquing coil 16 of the gyro 10.

The winding 320 is also effective upon energization to bias a relay switch arm 331 into contacting relation with a relay switch contact 333 connected by an electrical conductor 335 to the conductor 271. The relay switch arm 331 is connected by an electrical conductor 340 to the relay switch contact 269 which may be closed by the relay switch arm 265 upon energization of the relay winding 186.

Further, connected to the electrical conductor 340 is a conductor 342 which leads to a contact 344 controlled by a bi-metallic switch arm 345 of a conventional thermal relay 346 having a heater element 347 connected at one end to the electrical conductor 342 and at an opposite end to a common ground through an electrical conductor 349.

The arrangement is such that upon energization of the heater element 347 being effected by the closing of the switch contact 269 by the switch arm 265 upon energization of the winding 186 of the relay K2, the bi-metallic switch arm 345 will be effective to close the relay switch contact 344 after a predetermined timed delay period so as to effect in turn energization of the winding 320 of relay K6. The switch arm 331 of relay K6 is normally biased under spring tension out of contacting relation with the relay switch contact 333 while the relay switch arm 313 is normally biased under spring tension into contacting relation with the relay switch contact 315.

The winding 301 of relay K7 controls the operation of the relay switch arms 351 and 353. The relay switch arm 351 is connected through an electrical conductor 355 to the positive terminal of a source of electrical energy or battery 357 having a negative terminal connected to a common ground through an electrical conductor 359. Also electrically connected to the conductor 355 through a conductor 360 is a relay switch arm 174 controlled by the winding 166 of relay K1, as heretofore explained. The relay switch arm 353 of relay K7 on the other hand is connected through an electrical conductor 363 to a switch contact 291 normally closed by a switch arm 287 biased under spring tension into contacting relation therewith.

The switch arm 287 of relay K5 is connected through an electrical conductor 370 into the integrator network 375, as shown in detail in FIGURE 5, to control the operation thereof, as hereinafter explained, while the relay switch arm 353 of relay K7, as shown by FIGURE 4, is normally biased under spring tension into contacting relation with a relay switch contact 383 which is also connected through an electrical conductor 385 into the integrator network 375, shown in detail in FIGURE 5, to control the operation thereof, as hereinafter explained.

The relay switch arm 351 is normally biased under spring tension out of contacting relation with a relay-switch contact 390, but upon energization of the relay winding 301 of the relay K7, the switch arm 351 is biased into contacting relation with the switch contact 390 while the relay switch arm 353 is biased out of contacting relation with the relay switch contact 383.

An electrical conductor 395 connects the relay switch contact 390 of relay K7 into a preamplifier 400 of the integrator network 375 of FIGURE 5 to control the bias voltage applied thereto from the battery 357. Thus, upon the switch arm 351 of the relay K7 being out of contacting relation with the switch contact 390, the biasing voltage from the battery 357 for operating the preamplifier 400 applied through conductor 395 is disconnected therefrom so that the preamplifier 400 may not affect operation of the integrator network of FIGURE 5.

On the other hand, the switch arm 174 of relay K1 is operatively connected through the conductor 360 to the conductor 355 leading from the positive terminal of the battery 357 and so arranged that upon energization of the relay winding 166 the switch arm 174 is operatively positioned so as to close the relay switch contact 176 which is in turn connected through an electrical conductor 437 into an isolation amplifier 440 of the integrator network 375 to apply bias voltage thereto. Thus, upon the relay switch arm 174 opening the relay switch contact 176, the bias voltage from the battery 357 is disconnected from the isolation amplifier 440 so as to render the same ineffective to operate the integrator network 375 of FIGURE 5.

The winding 186 of the relay K2, in addition to operating the relay switch arm 265, is also effective upon energization to actuate a relay switch arm 500 so as to open a switch contact 502. The relay switch arm 500 is normally biased under spring tension into contacting relation with the switch contact 502. The relay switch arm 500 is connected by an electrical conductor 97 to the output conductor 68 leading from the source of alternating current 13. The relay contact 502 is connected by the electrical conductor 95 to the fixed phase winding 94 of the two-phase motor 92 of the synchronizer 80, heretofore described.

It will be seen then that upon energization of the winding 186 of relay K2 the relay switch arm 500 will be actuated out of contacting relation with the relay contact 502 so as to disconnect the fixed phase winding 94 of the motor 92 from the source of alternating current 13 and thereby render the synchronizer 80 inoperative for the period that the relay switch arm 500 is actuated to the position opening the contact 502.

In addition, the relay winding 186 also controls the operation of a relay switch arm 510 which is normally biased under spring tension into contacting relation with a relay switch contact 512. The relay switch contact 512 is connected through the conductor 125 to the output of the synchonizer 80, as heretofore explained. The relay switch arm 510 is in turn connected through a conductor 515 to a switch contact 517 which may be closed by the switch arm 29 which may be selectively operated by the operator so as to close either the switch contact 517 or a second contact 521 connected to the electrical conductor 35 leading to the output of the band-pass filter 19, as shown in FIGURE 1. The operator-operative switch arm 29 is further connected through an electrical conductor 523 to an input of the pre-amplifier 400 having an opposite input connected through a conductor 531 to common ground.

Further, the relay switch arm 510 is arranged to be actuated so as to open the relay switch contact 512 and close a relay switch contact 533 upon energization of the winding 186 of relay K2. The relay switch contact 533 is connected through an electrical conductor 127 to the output conductor 72 of the follow-up linear transducer 64, as heretofore explained.

From the foregoing it will be seen that upon the winding 186 of relay K2 being de-energized, the relay switch arm 510 will be in the position shown in FIGURE 4 closing the contact 512 and with the operator-operative switch arm 29 being in the position closing the switch contact 517 the output of the synchronizer 80 will be connected across the input to the pre-amplifier 400 of integrator network 375. However, upon energization of the relay winding 186, the relay switch arm 510 will be actuated from the position closing the relay switch contact 512 into a position closing the relay switch contact 533 whereupon the output of the linear transducer 64 will then be connected across the input of the pre-amplifier 400. Moreover, upon the operator selectively positioning the operator-operative control arm 29 into a position closing the contact 521, it will then be apparent that the output of the band-pass filter 19 will then be connected across the input to the pre-amplifier 400 of the integrator network 375.

*Integrator network*

In the integrator network 375, shown by FIGURE 5, an alternating current input is applied to the input of the pre-amplifier 400 from the output of the synchronizer 80 or follow-up transmitter 64, or output from the band-pass filter 19 as the case may be dependent upon the selective operation of the relay switch arm 510 and operator-operative switch arm 29. This alternating current signal applied to the input of the pre-amplifier 400 is in turn applied to the input of a demodulator 540 which provides a direct current output across the output lines 542 and 544 of an amplitude dependent upon the amplitude of the alternating current input signal applied through the input conductors 523 and 531 to the pre-amplifier 400.

The output conductor 544 leads to an input terminal 545 of an isolation amplifier 547. On the other hand, the output conductor 542 is connected through a suitable resistor 549 and a conductor 551 to an opposite input terminal 553 of the isolation amplifier 440. Connected across the conductors 544 and 551 is a capacitor 555 which provides with the resistance 549 a resistance-capacitance network. The resistance-capacitance network 549–555 has a relatively long time constant (sufficiently longer than the test period) so that the capacitor 555 may be charged up to a voltage value dependent upon the algebraic sum of the variable amplitude alternating current signals having the waveform of FIGURE 3 and applied during the time interval of the test Phase I or test Phase II to the input of the pre-amplifier 400.

The charge thus applied to the capacitor 555 is in turn applied across the input terminals 545 and 553 of the isolation amplifier 440 so as to effect in normal operation of the amplifier 440 a direct current across output conductors 560 and 562 of an amplitude proportional to the charge applied to the capacitor 555.

The output conductor 562 is connected to a common ground and thereby to a grounded input terminal 565 of the relay amplifier 225. As opposite input terminal 569 of the relay amplifier 225 is connected through a conductor 571 to a negative terminal of a biasing battery 573 which has the positive terminal thereof connected to the conductor 560 leading from the isolation amplifier 440.

The arrangement is such that a direct current signal applied from the isolation amplifier 440 through the conductor 560 is of a positive potential while a negative potential is applied to the output conductor 562 leading from the amplifier 440. The direct current signal applied across the input terminals 565 and 569 of the relay amplifier 225 will be of a value equal to the algebraic difference between that of the biasing voltage of the battery 573 and the signal voltage applied across the output conductors 560 and 562 and which normally acts in opposition to that of the biasing voltage from the battery 573.

The differential voltage applied across the input terminals 565 and 569 of the relay amplifier 225 is then in turn amplified and applied by the relay amplifier 225 across the output conductors 222 and 223 leading to the relay winding 220 of the relay K3 to control the energization thereof.

It will be seen then that the charge applied to the capacitor 555 of the integrator network 375 will build up until an output across the capacitor 555 equals, upon amplification by the isolation amplifier 440, the biasing voltage of the battery 573 at which time there would be applied a zero voltage to the output of the relay amplifier 225 and thereby to the relay winding 220. This in turn will effect a de-energization of the relay K3 causing the relay switch arms 214 and 226 to be biased under the spring force thereof out of contacting relation with the respective switch contacts 212 and 230 and whereupon the relay switch arm 226 is biased into contacting relation with the switch contact 228. The purpose of this operation will be explained in greater detail hereinafter.

A voltmeter 600 has one terminal connected by an electrical conductor 602 to the output conductor 560 leading from the isolation amplifier 440 while an opposite terminal is connected by an electrical conductor 604 to a common ground and thereby to the grounded output conductor 562 leading from the isolation amplifier 440. Further, the voltmeter 600 connected across the output of the isolation amplifier 440 has an indicator pointer 606 arranged to cooperate with suitable indicia 608 and 610 indicating an erroneous operating condition, and an indicia range 612 indicating a proper operating range, as will be hereinafter explained.

Operation

In the system to which the present invention is applied (shown in FIGURE 1), there is induced a yaw rate signal at the output of the rate gyro 10 which is applied through a band-pass filter 19. While the break frequencies of this filter 19 are dependent upon the aircraft, the transfer function of the filter 19 will have a specific time response to a step command signal, which is the controlling factor of the test technique.

Figure 3:
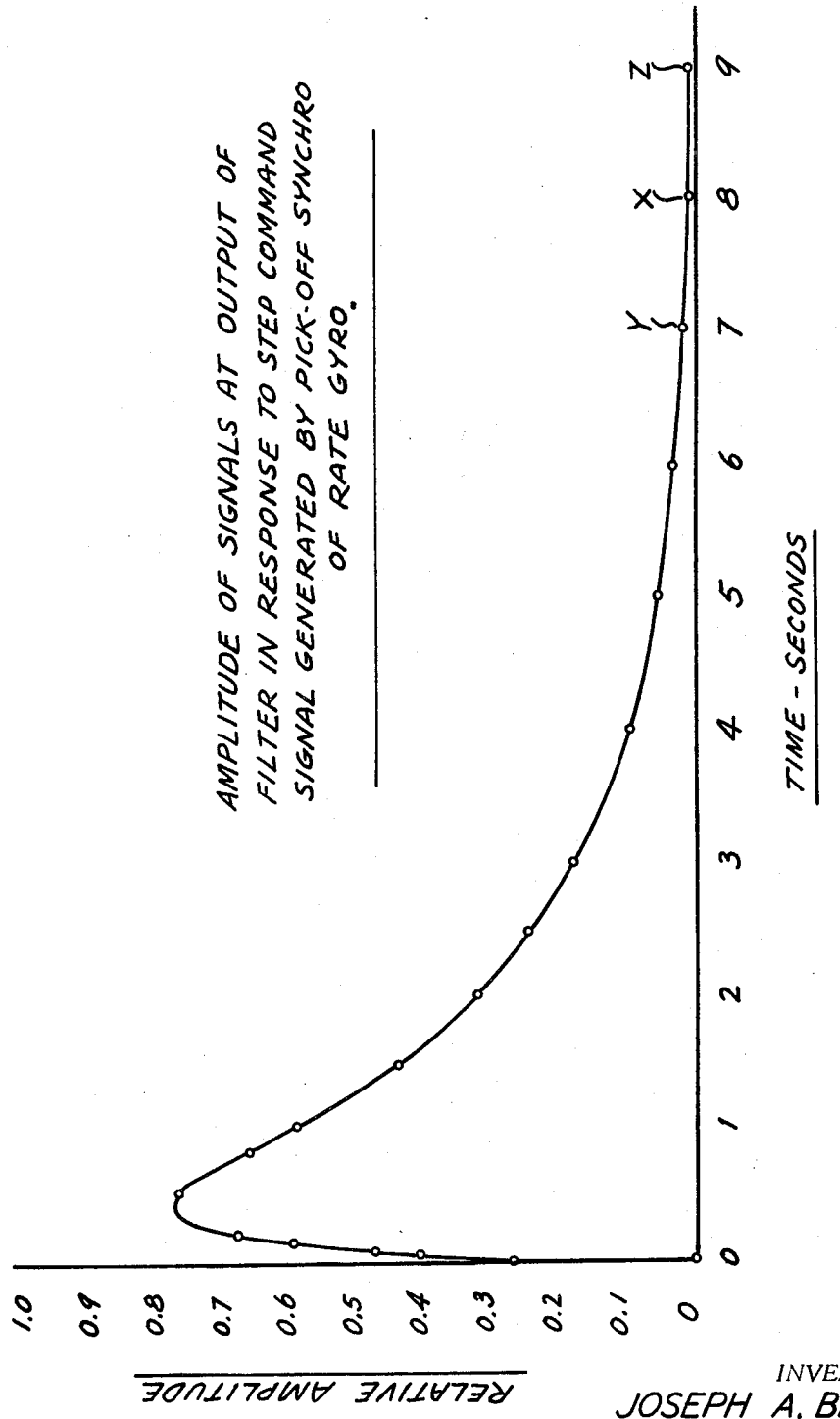
FIGURE 3 is an enlarged graphical illustration of the typical waveform of the amplitude of the signal effected at the output of the band-pass filter in response to the input command signal during the first test phase and of which the output signal at the second test phase has an amplitude waveform which is a reverse mirror image as shown by the graph of FIGURE 2.

The form of the variable amplitude signals at the output of the band-pass filter 19 is shown graphically at FIGURE 3. The rate gyro 10 is of a conventinal type such as disclosed and claimed in the copending U.S. appllication Ser. No. 327,268 filed Dec. 2, 1963, by Alex Moreswich and assigned to the Bendix Corporation. Such rate gyroscope 10 is equipped with a test coil indicated diagrammatically in FIGURE 1 by the numeral 16. The test coil 16 when excited displaces the gyro gimbal so as to produce a step output command signal at the pick-off synchro 11. The application of this excitation to the test coil 16 of the rate gyroscope 10 is the prime mover for the test operations.

Figure 2:
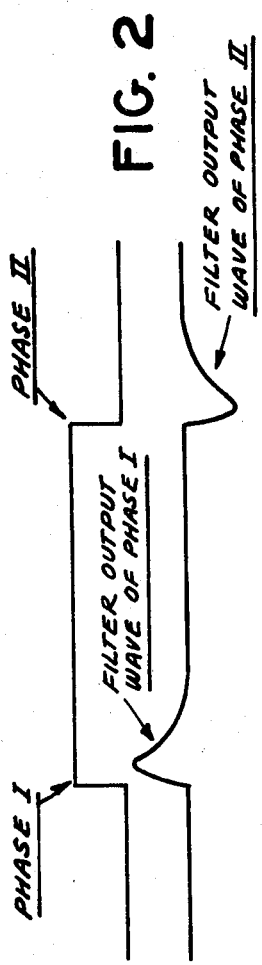
FIGURE 2 is a graphical illustration showing a typical waveform of the amplitude of the signals effected at the output of the band-pass filter of FIGURE 1 in response to the step input command signals of the first and second test phases.

System performance is evaluated by integrating two signals, Phase I and Phase II, over individual test periods. In proper operation, these signals all start from null and return to null during the test period, as shown graphically at FIGURE 2, in which the Phase I signal is a positive going signal of an amplitude shown by the Phase I waveform while the Phase II signal is applied in an opposite negative going sense of an amplitude shown by the Phase II waveform and a reverse mirror image of the waveform of the Phase I signal. These signals are applied at the output of the band-pass filter 19. The test timing is not critical and the test configuration serves to perform an evaluation of the signal nulls.

The signals to be tested have specific time histories, primarily controlled by the system band-pass filter 19. Thus, all signal magnitudes and the critical dynamic response characteristics of the entire system may be evaluated in a practical manner without tight tolerance control of the test network.

The self-test feature of the invention is internal to the equipment of the automatic pilot; i.e., the automatic pilot has its test facilities included therein so as to eliminate need for external support equipment and is so arranged as to only be initiated with the aircraft on the ground and with the damper system in a disengaged or inoperative relation. The test switch 28 may then be momentarily actuated by the operator and thereafter if a successful test is effected, a "go" indication will appear by illumination of the green lamp 236 at completion of the Phase I test and before initiating the Phase II test.

Phase II of the test is initiated upon completion of the Phase I test by engaging or rendering the damper or servo valve and piston control mechanism 51 effective. If the second stage of the Phase II test is thereafter successful, the "go" indication will be repeated by illumination of the green lamp 236 at test completion. The test is completed by the operator pushing the wheel disconnect switch 132 so as to open the switch contacts 131 and 133 and thereupon extinguish the test indication effected by the illumination of the lamp 236 and disengage or render ineffective the damper control mechanism 51. A failure in the damper or the test circuitry during the Phase II test will result in a "no-go" indication effected by illumination of the lamp 245.

The incorporation of the self-test capability of the present invention in an automatic pilot or damper system is advantageous for line maintenance. To obtain maximum utilization, the "go-no-go" indication is supplemented by the indication of the voltmeter 600 shown diagrammatically in FIGURE 5. This voltmeter 600 will monitor the output voltage of the integrator network 375 and will be of aid in locating a faulty component. A test of the output of the band-pass filter 19 will be of significant help in line maintenance. Thus upon an indicated fault in the Phase I or Phase II test, the operator-operative switch 29 may be selectively positioned so as to apply the output from the band-pass filter 19 to the input of the integrator network 535.

A time history of a typical test signal is shown graphically in FIGURE 3. This signal is the output of the band-pass filter 19 (with "breaks" at, for example, .59 radians per second and 6.9 radians per second) to a unity step input.

The selection of the output of the band-pass filter 19 as the typical signal is for simplicity. The signals to be evaluated are the output of the synchronizer 89 and the position follow-up or linear transducer 64. Both of these signals approximate the output of the band-pass filter 19.

The amplifier 225 for controlling the winding 220 of the relay K3, as hereinafter described, utilizes conventional relay techniques. For adjustable tolerance control, the relay K3 will be biased by the battery 573 into an energized or engaged position and will be triggered or de-energized to "off" for test control by the action of the integrator network 375. At test initiation, a B-plus operating voltage is applied to the amplifier 440 through the conductor 437, whereupon as the output from the integrator 375 approaches the bias of the battery 573, the energizing current to the winding 220 of the relay K3 will decrease to zero causing the relay K3 to drop out. The gain of the relay amplifier 225 is adjustable by suitable means, such as a potentiometer, which may be adjusted by the operator; this gain adjustment controls the tolerance of the test feature.

The design of the integrator network 375 is non-critical because of the limited requirements of the test circuit. There are two outputs, electrically isolated in the total design. One output shall function in conjunction with the bias signal of battery 573 and gain control of the relay amplifier 225 to control energization of the relay winding 220, and the second output shall drive a meter movement 600.

The integrator network 375 is designed with a control such as to reduce the output to null (series switches 287 and 353 of relays K5 and K7 of FIGURE 3). It also has a control to stop the integrating action but maintain the output of the integrator 375 (control voltage switch 351 of relay K7 of FIGURE 4).

Discharge of the integrator output is accomplished in the triggering time of relay K7. Referring to FIGURE 4, as relay K5 drops to cause switch 235 to close contact 288, it effects energization of winding 301 to operate relay K7 to cause switch 353 to open contact 383 and the combination of the action of both relays K5 and K7 being non-engaged controls integrator discharge.

Integrator action is controlled in three ways: (1) amplifier excitation is applied to the integrator network 375 only during test, (2) control voltage is applied to the integrator network 375 only during the individual test time periods and the lead time to the test of the follow-up signal (to evaluate system nulls), (3) the output of the integrator network 375 is maintained at null prior to the test time and is returned to null prior to the second phase of the test by the action of the switch 287 in closing contact 291 of relay K5 and switch 353 in closing contact 383 of relay K7 so as to shunt the capacitor 555.

Individual test times are controlled by the switch 251 of relay K4. At the completion of each test period, the integrator network 375 is deactivated but the output is maintained.

Referring to FIGURE 1 in effecting the test Phase I, the damper must be disengaged as upon the solenoid winding 110 being de-energized to cause the shut-off valve controlled thereby to be closed to render the servo valve and piston device 51 inoperative with switch 118 being in an open relation to contact 182 in which condition the aircraft must be on the ground with switch 148 closing contact 150. Momentary actuation of the test button 28 to close contact 153 and 160 will energize winding 166 of relay K1 which locks up through the wheel disconnect switch 132. This applies B-plus operating voltage from battery 407 to the test amplifier 547 through conductor 437. The output of the integrator amplifier 547 is at null and the bias signal from battery 573 will trigger relay K3. This will operate relay K4 which locks up and applies voltage to time-delay relay K5 through switch 265 of K2, the gyro test coil 16 through switch 313 of relay K6, and operates relay K7 through switch 285 of relay K5.

The operation of relay K7 removes the short on integrator 375 by switch 353 opening contact 383 so that control voltage may be applied to the integrator network 375. The voltage applied to the test coil 16 of the gyro 10 will displace the gyro gimbal, and produce a step output command signal. This signal will be processed through the band-pass filter 19 and will result in a signal with the characteristic shown in FIGURE 3. Since the damper control device 51 is not operative or engaged, the synchronizer 80 will "wash out" the output of the filter 19 and thus reproduce a filter output as a synchronizer signal.

There is thus produced at the output of the integrator network 375 a voltage equal to the bias voltage applied by the battery 573 to the input of relay amplifier 225 and thereby setting the input to the amplifier 225 at zero to de-energize the relay K3. The amplifier gain associated with relay K3 will establish the accuracy requirement of the damper system.

The test cycle will be completed prior to the operation of time delay relay K5. Thus, if system performance is acceptable, relay K3 will be de-energized causing switch arm 226 to close contact 228 before relay K5 is actuated and thereafter upon relay K5 being energized causing switch arm 285 to close contact 289 to effect illumination of the green lamp 236. If there is a failure, relay K3 will continue to be energized so that upon relay K5 being energized switch arm 285 in closing contact 289 of relay K5 will be effective through the closure of contact 330 by switch 226 of relay K3 to cause illumination of the red lamp 245.

Should a failure occur in the relay amplifier 225 or in the relay K4, an immediate illumination of the red lamp 245 will be effected, since relay K3 will be de-energized causing switch 214 to open contact 212 de-energizing the winding 255 of relay K4, whereupon switch 251 will close contact 249 to effect energization of the red lamp 245.

The operation of relay K5 causes switch 285 to open contact 288 so as to remove voltage from winding 301 of relay K7 which upon de-energization in turn causes switch 351 to open contact 390 to remove the B-plus operating voltage applied through conductor 395 to the pre-amplifier 400 of the integrator network 375. The "shorting-circuit" on the output of the integrator network 375 remains open by switch 287 opening contact 291 upon the energization of winding 283 of relay K5.

In initiating the Phase II test operation, energization of the test indication green light 236 provides a guide to initiation of Phase II of the test. This Phase II is primarily an evaluation of the boost package 51–55 and is initiated upon the damper control device 51 being rendered operative by energization of the shut-off valve control solenoid 110.

The Phase II test is initiated then by the operator positioning switch 198 so as to close contact 196 to energize relay winding 180 so as to cause switch 118 to open contact 144 and close contact 182 effecting in turn energization of winding 186 of relay K2 which actuates arm 265 so as to open contact 267 to remove excitation from the winding 283 of relay K5 and heater 279 of the timer 275 while switch 265 of relay K2 is thereupon actuated so as to close contact 269 so as to apply voltage to the heater 347 of the timer 346 controlling the winding 320 of relay K6, the energization of relay winding 186 further actuates switch 510 to open contact 512 and close contact 533 to thereupon transfer the input of the integrator network 375 to the boost follow-up transmitter 64. Moreover, the switch 265, in opening contact 267 of relay K2, effects de-energization of winding 283 of relay K5.

Removal of excitation from the winding 283 of relay K5 causes switch 285 to open contact 289 to extinguish the green lamp 236 and switch 287 of relay K5 to close contact 291 to provide a momentary short across the capacitor 555 of the integrator network 375 while the switch 285 closes contact 288 to effectively energize winding 301 of relay K7. The resulting energization of relay K7 causes the switch 353 to open contact 383 to remove the short across capacitor 555 while simultaneously the switch 351 of relay K7 closes contact 390 to apply control voltage excitation through conductor 395 to the pre-amplifier 400 of the integrator network 375. The output of the integrator network 375 is thereupon initially zero, so that the bias voltage of battery 573 will effect energization of winding 220 of the relay K3 through the relay amplifier 225.

The application of voltage to the time delay relay 346 controlling the relay K6 by switch 265 opening contact 267 and closing contact 269 upon the energization of winding 186 of relay K2 initiates a time period for the thermal timer 275 controlling relay K5 to cool and for the null of the follow-up transmitter 64 to be checked. The energization of relay K6 after the predetermined time interval provided by the thermal timer 346 has elapsed reapplies voltage to thermal timer 275 controlling relay K5 upon switch arm 331 of relay K6 closing contact 333 while switch 313 simultaneously opens contact 315 to remove excitation from the gyro test coil 16. This causes the gyro gimbal to return to the neutral position whereupon the pick-off synchro 11 changes the output signal. This signal change will be processed through the band-pass filter 19 and result in a signal with the characteristic of Phase II of FIGURE 2. Because the damper control device 51–55 is in an operative condition due to energization of solenoid 110, the damper actuator will be extended in response to the output signals from filter 19 so as to cause the follow-up synchro 64 to provide signals of a substantially reverse image thereof.

As before, the self-test network 23 will cause the integrator network 375 to produce an output equal to the bias voltage of battery 573 and thus generate an input to the relay amplifier 225 of zero volts. The Phase II test will be completed prior to the re-operation of relay K5 and the illumination of the associated green lamp 236 indicating a successful completion of the Phase II test.

In the Phase I and Phase II tests, it will be noted that in the integrator network 375 the charge applied to the capacitor 555 builds up until a point X, for example, of the graph of FIGURE 3 is reached, at which time the output across the capacitor 555 after amplification by the amplifier 547 has a value equal to the biasing voltage of the battery 573. At this time, then, the voltage applied through the relay amplifier 225 to the output lines 222 and 223 has a zero value; whereupon, the winding 220 of relay K3 is de-energized so that the relay switches 214 and 226 under spring force open the respective contacts 212 and 230 and switch 226 closes contact 228 connected to the filament 234 of the green indicator lamp 236.

Now if the amplitude of the alternating current signals applied at the input 523–531 of the integrator network 375 is of the waveform shown graphically by FIGURE 3 or slightly shifted within a safe operative range so that the relay K3 is de-energized within the indicated range X, Y and Z, and with the timer 275 so set as to effect energization of the winding 283 of the relay K5 at a point in time indicated at X of FIGURE 3 and within the safe operating range X, Y and Z of the de-energization of the relay K3, then illumination of the green lamp 236 would be affected and continued as indicative of a successful completion of the Phase I or Phase II test, as the case may be.

On the other hand, if the amplitude of the alternating current signals applied at the input 523–531 of the integrator network 375 is of a waveform so shifted from that shown in FIGURE 3 that the accumulated charge applied to the capacitor 555 causes the winding 220 of relay K3 to be de-energized at a point in time before the safe operating range X, Y and Z, then the charge applied to the capacitor 555 would continue to build up until the output across the capacitor 555 after amplification will have a value sufficient to so exceed the biasing voltage of the battery 573 as to effect through the amplifier 225 a re-energization of the winding 220 of the relay K3 causing the relay switch 226 to close contact 230, either before or after the energization of the relay K5 under the control of the timer 275 at the point in time indicated at X of FIGURE 3; whereupon, illumination of the red lamp 245 would be effected as indicative of an unsuccessful completion of the Phase I or Phase II test and unsafe operating conditions of the system under test.

Similarly, if the amplitude waveform of FIGURE 3 is so shifted as not to effect through the integrator network 375 and relay amplifier 225 a de-energization of the winding 220 of relay K3, the relay switch 226 will be held in a closed relation with contact 230 and upon the relay K5 being energized by the timer 275 at the point in time X of the graph of FIGURE 3, the red lamp will be similarly illuminated as indicative of an unsatisfactory operating condition of the system under test.

The test lamp 236 or 245, as the case may be, is extinguished by the operator pressing the operator-operative disconnect control 132 which opens the energizing circuit for winding 189 to render inoperative the damper control device 51–55 and complete the test cycle.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. Means for testing a control system of a type including a condition sensor means for operating said control system; the combination comprising means for torquing said condition sensor means so as to provide output signals for testing said control system, means responsive to said test signals for effecting signals of a variable amplitude waveform, condition indicator means responsive to said signals of the variable amplitude waveform, timing means for rendering said condition indicator means effective after a predetermined time interval to provide a test phase, operator-operative means to simultaneously initiate operation of said torquing means and said timing means, and said condition indicator means being rendered effective by said timing means after said predetermined time interval has elapsed to provide an indication of an operative condition of said control system in response to said signals of the variable amplitude waveform.

2. The combination defined by claim 1 in which said condition indicator means includes means for integrating the signals of the variable amplitude waveform to effect a resultant signal, first means responsive to said resultant signal and selectively operable to provide an indication of an operative condition of said control system, and second means conditioned by said timing means after the predetermined time interval has elapsed to render this first means effective to provide said indication.

3. The combination defined by claim 2 in which said integrating means includes a resistance-capacitance network having a time constant sufficiently longer than the predetermined time interval that the capacitance may be charged to a voltage value dependent upon the algebraic sum of the signals of the variable amplitude waveform, and means responsive to the charge applied to said capacitance to effect said resultant signal.

4. The combination defined by claim 1 in which said operator-operative means includes means to simultaneously initiate operation of said timing means and said torquing means in one sense, and other means to simultaneously initiate operation of said timing means and said torquing means in another sense.

5. The combination defined by claim 4 in which the condition indicator means includes means for integrating the signals of the variable amplitude waveform so as to provide as an algebraic sum of said signals a resultant signal, first means responsive to said resultant signal and selectively operable to provide an indication of an operative condition of said control system, and second means conditioned by said timing means after the predetermined time interval has elapsed to render the first means effective to provide said indication.

6. The combination defined by claim 5 in which said integrating means includes a resistance-capacitance network having a time constant sufficiently greater than the predetermined interval that the capacitance may be charged to a voltage value dependent upon the algebraic sum of the signals of the variable amplitude waveform, and means responsive to the charge applied to said capacitance to effect said resultant signal.

7. The combination defined by claim 1 in which said control system includes first and second motor means, and selectively operable means for rendering the first and second motor means alternately operable, and said operator-operative means includes control means to operate said selectively operable means in one sense to render said first motor means operative and said second motor means inoperative, and said control means to operate said selectively operable means in another sense to render said second motor means operative and said first motor means inoperative, said first and second motor means each including means responsive to the first mentioned signals of the variable amplitude waveform and effective upon one of said first and second motor means being rendered operative to control the operation of said one motor means, signal generator means adjustably positioned by said one motor means to provide other signals of a waveform corresponding to said variable amplitude waveform of said first mentioned signals, and means operatively connecting said other signals of the variable amplitude waveform to said condition indicator means.

8. The combination defined by claim 7 in which said condition indicator means includes means for integrating the signals of the variable amplitude waveform to effect a resultant signal, first means responsive to said resultant signal and selectively operable to provide an indication of an operative condition of said control system, and second means conditioned by said timing means after the predetermined time interval has elapsed to render the first means effective to provide said indication.

9. The combination defined by claim 8 in which said integrating means includes a resistance-capacitance network having a time constant sufficiently longer than the predetermined time interval that the capacitance may be charged to a voltage value dependent upon the algebraic sum of the signals of the variable amplitude waveform, and means responsive to the charge applied to said capacitance to effect said resultant signal.

10. The combination defined by claim 9 in which said operator-operative means includes means to simultaneously initiate operation of said timing means and said torquing means in one sense upon said selectively operable means being operated by said control means in said one sense, and said operator-operative means includes other means to simultaneously initiate operation of said timing means and said torquing means in another sense following operation of said selectively operable means in another sense by said control means.

11. The combination defined by claim 10 in which said other means includes means to effect a predetermined delay in the simultaneous initiation of operation of said timing means and said torquing means in said other sense.

12. Means for testing an aircraft control system of a type including a rate gyroscope having first means for generating first alternating current signals to control the system and means for alternately torquing the rate gyroscope in first and second senses, a first servo mechanism having second means for generating second alternating current output signals, a second servo mechanism having third means for generating third alternating current output signals, the control system including a band-pass filter and an amplifying means operatively connected between the first means for generating first alternating current signals and the first and second servo mechanisms, the band-pass filter being responsive to said first signals for effecting alternating current control signals of a variable amplitude waveform to be applied to an input of said amplifying means to control said first and second servo mechanisms, and other means to apply said second and third alternating current signals to the input of said amplifying means in opposing relation to said control signals of variable amplitude waveform, and means drivingly connecting one of said servo mechanisms to a control surface of the aircraft to operatively position the control surface; said testing means comprising selectively operable means to render said first and second servo mechanisms alternately operable in response to an output of said amplifying means, control means operable in a sense to cause the torquing means to torque the rate gyroscope in one sense and to cause said selectively operable means to render one of said servo mechanisms operative in response to the output of said amplifying means, said control means being operable in another sense to cause the torque means to torque the rate gyroscope in an opposite sense and to cause the selectively operable means to render the other of said servo mechanism operative in response to the output of said amplifying means, and condition indicator means responsive to the output signals from the generating means of the selectively operated servo mechanism to provide an indication of an operative condition of the aircraft control system.

13. The combination defined by claim 12 including other control means operable in a sense to cause said condition indicator means to be responsive to the alternating current control signals of the variable amplitude waveform effected by the band-pass filter upon the torquing of said rate gyroscope in one of said first and second senses to provide an indication of an operative condition of the aircraft control system.

14. The combination defined by claim 12 in which said condition indicator means includes means for integrating the signals from the generating means of the selectively operated servo mechanism to effect a resultant signal, and means responsive to said resultant signal and selectively operable after a predetermined time interval has elapsed to provide an indication of an operative condition of said control system.

15. The combination defined by claim 12 including timing means for rendering said condition indicator means effective after a predetermined time interval to provide a test phase, operator-operative means to simultaneously initiate operation of said torquing means and said timing means, and said condition indicator means being rendered effective by said timing means after said predetermined time interval has elapsed to provide an indication of an operative condition of said control system.

16. The combination defined by claim 15 in which said condition indicator means includes means for integrating the signals from the generating means of the selectively operated servo mechanism to effect a resultant signal, first means responsive to said resultant signal and selectively operable to provide an indication of an operative condition of said control system, and second means conditioned by said timing means after the predetermined time interval has elapsed to render this first means effective to provide said indication.

17. The combination defined by claim 16 in which said integrating means includes a resistance-capacitance network having a time constant sufficiently longer than the predetermined time interval that the capacitance may be charged to a voltage value dependent upon the algebraic sum of the signals from the generating means of the selectively operated servo mechanism, and means responsive to the charge applied to said capacitance to effect said resultant signal.

18. The combination defined by claim 15 in which said operator-operative means includes means to simultaneously initiate operation of said timing means and said torquing means in one sense, and other means to simultaneously initiate operation of said timing means and said torquing means in another sense.

19. The combination defined by claim 18 in which the condition indicator means includes means for integrating the signals from the generating means of the selectively operated servo mechanism so as to provide as an algebraic sum of said signals a resultant signal, first means responsive to said resultant signal and selectively operable to provide an indication of an operative condition of said control system, and second means conditioned by said timing means after the predetermined time interval has elapsed to render the first means effective to provide said indication.

20. The combination defined by claim 19 in which said integrating means includes a resistance-capacitance network having a time constant sufficiently greater than the predetermined interval that the capacitance may be charged to a voltage value dependent upon the algebraic sum of the signals from the generating means of the selectively operated servo mechanism, and means responsive to the charge applied to said capacitance to effect said resultant signal.

No references cited.

THOMAS B. HABECKER, *Primary Examiner.*